Oct. 30, 1928.
C. G. ROSS
1,689,689
INTERNAL COMBUSTION ENGINE
Filed May 9, 1927  2 Sheets-Sheet 1
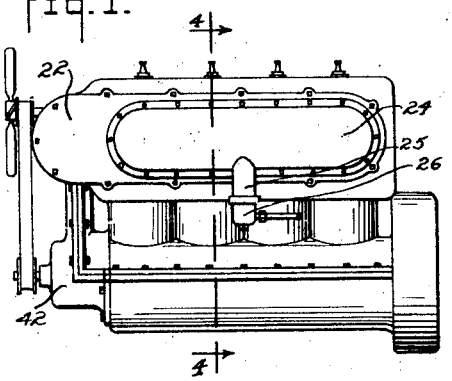
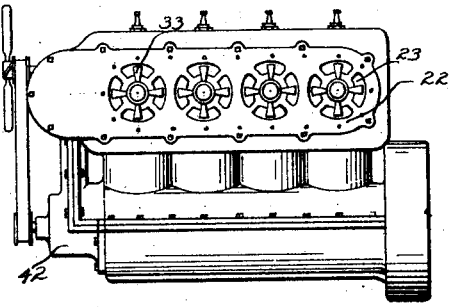
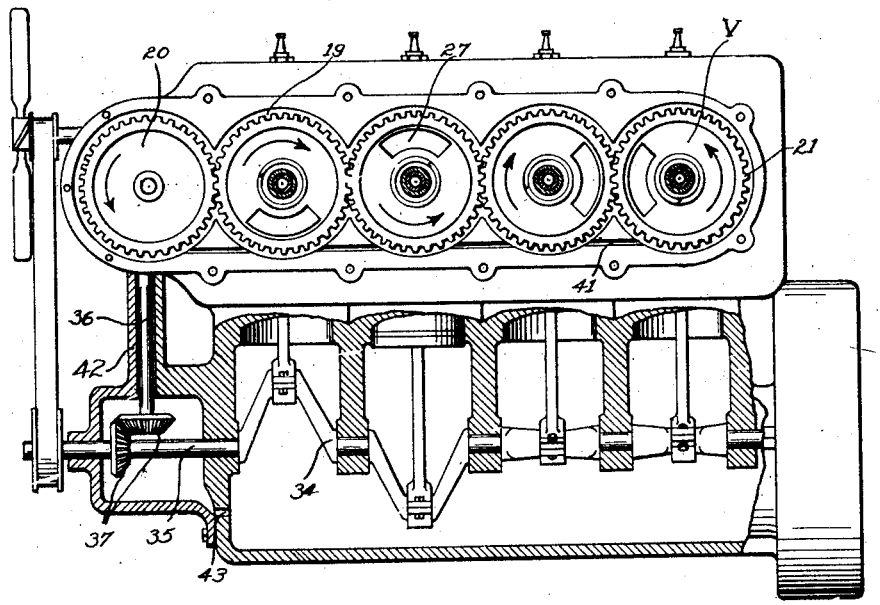
INVENTOR
Chester Gorden Ross
BY
ATTORNEY Oct. 30, 1928.
C. G. ROSS
1,689,689
INTERNAL COMBUSTION ENGINE
Filed May 9, 1927    2 Sheets-Sheet 2
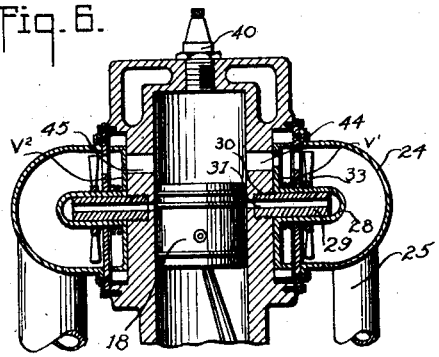
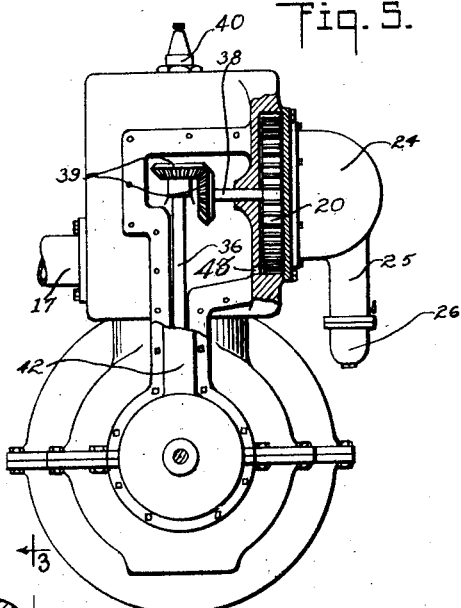
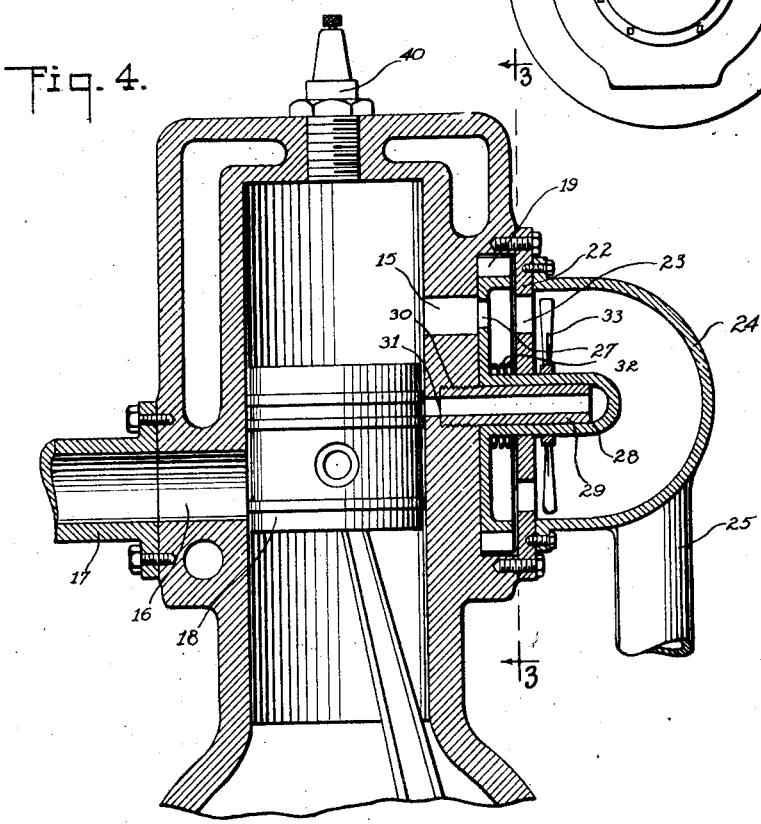
INVENTOR
Chester Gorden Ross
BY
ATTORNEY Patented Oct. 30, 1928.

1,689,689

UNITED STATES PATENT OFFICE.

CHESTER GORDEN ROSS, OF GLENDALE, CALIFORNIA.

INTERNAL-COMBUSTION ENGINE.

Application filed May 9, 1927. Serial No. 189,925.

My invention relates to internal combustion engines, and a purpose thereof is the provision of an engine which eliminates the use of the usual poppet valves and their disadvantages by employing rotary disk valves whereby an engine is produced of greatly increased power, structural simplicity, and superior smoothness, and silence in operation as against the poppet valve type of engine.
It is also a purpose of my invention to provide in an engine a rotary valve mechanism which is applicable to both two- and four-cycle engines with any number of cylinders; means by which the thorough and automatic lubrication of the valves and their operating mechanism is at all times effected; and means associated with the valves for further vaporizing the gaseous fuel mixture before entering the cylinders.
I will describe only two forms of internal combustion engines embodying my invention and will point out the novel features thereof in claims.

In the accompanying drawings, Fig. 1 is a view showing in side elevation one form of internal combustion engine embodying my invention;

Fig. 2 is a view similar to Fig. 1, with the intake manifold thereof removed;
Fig. 3 is a vertical sectional view taken on the line 3—3 of Fig. 4;

Fig. 4 is a vertical sectional view taken on the line 4—4 of Fig. 1;

Fig. 5 is a view showing the engine in front elevation and partly in section;

Fig. 6 is a view similar to Fig. 4.

Referring specifically to the drawings, my invention, in the embodiment shown in Figures 1 to 5 inclusive, is incorporated in a two-cycle, four-cylinder internal combustion engine. As shown in Figure 4, each cylinder is provided in the block thereof with an intake port 15 and below and at the opposite side an exhaust port 16 in communication with an exhaust manifold 17 common to the exhaust ports for all of the cylinders. Each exhaust port is controlled by the piston 18 within the cylinder, as will be more fully described hereinafter.
That side of the cylinder block of the engine corresponding to the intake ports 15 is constructed to form a plurality of circular pockets 19, one for each of the ports 15 and one for a driving gear 20. As clearly shown in Figure 3, the several pockets communicate with each other at their peripheries in order that rotary disk valves V provided on their peripheries with gear teeth 21 may have intermeshing relation with each other and with the driving gear 20 so that when the gear is driven driving of all of the valves is effected.

The several valves V, as well as the driving gear 20, are confined within the respective pockets 19 by means of a plate 22 bolted to the cylinder block and provided at intervals corresponding to the valve pockets with a circular series of openings 23 for the purpose of admitting fuel mixture to the valves from an intake manifold 24 bolted to the plate 22 and covering all the openings 23. By means of a branch pipe 25, the manifold 24 may be connected to a carbureter 26, as clearly illustrated in Figure 1, in order that the fuel mixture from the carbureter may be conducted by the manifold to the several valves of the engine.

As the construction and mounting of the several valves V is identical, a description of one will suffice for all. As clearly illustrated in Figure 4, the valve V is provided with a port 27 positioned adjacent the periphery of the disk so that in the rotative movement of the valve it will register with the intake port 15 at each revolution of the valve. The valve disk is provided with an elongated tubular hub 28 which functions as a shaft for the valve and which is rotatably supported by a tubular axle 29 threaded at one end in the cylinder block, as indicated at 30, and having communication with an oil port 31 in the cylinder block. The outer end of the hub or shaft 28 is closed in order to prevent passage of the fuel mixture from the intake manifold into the port 31, and, conversely, to prevent oil which enters the stub shaft 29 from passing into the intake manifold. In order that the disk valve may properly function to admit fuel mixture to the intake port 15 at the required intervals the valve is yieldably urged horizontally against the cylinder block by means of a coiled expansible spring 32 interposed between the plate 22 and the valve. For the purpose of further vaporizing the gaseous fuel before it is admitted to the cylinder through the port 15, a fan 33 is fixed on the shaft 28 so as to rotate with the shaft and to thereby more thoroughly intermix the fuel and air before passage into the cylinder.

As shown in Figures 3 and 5, the driving gear 20 is driven from the crank shaft 34 of the engine, the forward end of the latter being provided with a shaft extension 35 operatively connected to a vertical shaft 36, through miter gears 37. The shaft 36 is arranged at the forward end of the cylinder block in suitable bearings and is operatively connected to a shaft 38 to which the driving gear 20 is fixed through miter gears 39. By this mechanism the several valves V can be continuously rotated so that with the ports 27 thereof properly positioned relatively gaseous fuel will be admitted to the several cylinders, and through the medium of spark plugs 40 the explosion of such mixture can be effected in the proper order. As previously stated, the uncovering of the exhaust ports 16 is controlled by means of the pistons 18 and in such relation to the opening of the intake ports 15 as to be slightly in advance thereof, thereby permitting the influx of gaseous fuel into the cylinders to aid in exhausting the burnt gases from the cylinders. This process is furthered by the fans 33, it being understood that the fans will also function to drive gaseous fuel into the cylinders. This engine is of the two-cycle type with the intake of fuel occurring simultaneously with the exhaust of the burnt gases therefrom. My invention is not restricted to two-cycle engines, but may be applied to four-cycle engines, as will be described hereinafter.

For the purpose of thoroughly and automatically lubricating the several valves, as well as the mechanism for driving the latter, the several ports 31 are provided through which oil from the cylinders can pass into the tubular axles 29 and from the latter between the axles and shafts 28 to lubricate the contacting surfaces of the two. From these two points the oil may continue to the inner surface of the valves to lubricate the latter in respect to the contacting surfaces of the cylinder block. In this manner, the thorough lubrication of the valves is effected. Any excess oil is conducted from the several pockets 19 through ducts 41 (Figure 3) connecting the several pockets at points adjacent the bottom thereof and all inclined toward the pocket for the gear 20 so that the excess oil will be conducted to such pocket and drained from the latter through the housing 42 for the shafts 35 and 36 back to the crank case through a port 43.

Referring now to Figure 6, I have here shown another form of engine embodying my invention for the purpose of illustrating the adaptation of the valve mechanism to a four-cycle internal combustion engine. In this embodiment of my invention, each cylinder is provided with an intake port 44 and an exhaust port 45 formed at diametrically opposed points in the cylinder block and controlled by rotary disk valves V' and V², respectively, supported and operated in the same manner as the valves V and in proper sequence in keeping with four-cycle engines.

Although I have herein shown and described only two forms of internal combustion engine embodying my invention, it is to be understood that various changes and modifications may be made therein without departing from the spirit of the invention and the spirit and scope of the appended claims.

I claim as my invention:

1. In an internal combustion engine, ports in the walls of the cylinders, communicating pockets in the outer walls of the cylinders, rotary disk valves in the pockets having their peripheries formed with intermeshing teeth to provide driving connections between the valves, means for driving one of the valves, an intake manifold covering all of the pockets, and means in the manifold and operable by the valves for further vaporizing and positively injecting a gaseous fuel into the cylinders through said ports.

2. In an internal combustion engine, a cylinder block having communicating pockets therein, intake ports in the cylinder block one in each of the pockets, lubricating ports in the cylinder block one for each of the pockets and cylinders, tubular axles secured in the cylinder block and communicating with the lubricating ports, rotary disk valves in the pockets having intermeshing peripheral teeth and tubular shafts mounted on the axles, a perforated plate secured to the cylinder block in covering relation to the pockets, an intake manifold in covering relation to the openings of the plate, and an additional pocket on the cylinder block, a driving gear in said pocket meshing with the teeth of one of said valves, driving means for said gear operatively connected to the crank shaft of the engine, a housing for said driving means interiorly communicating with the crank case of the engine, and ducts in the cylinder block adjacent the bottom of the pockets and inclined toward the driving gear pocket for conducting excess oil from the pockets to said housing whereby the oil will be returned to the crank case.

3. In an internal combustion engine, a cylinder block having communicating pockets in one wall thereof one for each of the cylinders, intake ports in the cylinder block one for each of the cylinders and pockets, tubular axles on the cylinder block one for each of the pockets and communicating with ports formed in the cylinder block to receive oil from the cylinders, rotary disk valves in the pockets and provided with tubular shafts mounted on the axles to receive oil conducted to the latter through said ports and in a manner to lubricate the valves, means for driving the valves, and an intake manifold secured in covering relation to all of the pockets.

4. In an internal combustion engine, a cylinder block having communicating pockets in one wall thereof one for each of the cylinders, intake ports in the cylinder block one for each of the cylinders and pockets, axles on the cylinder block one for each of the pockets, rotary disk valves mounted on the axles and rotatable in said pockets, means for driving the valves, an intake manifold secured in covering relation to all of the pockets, and fans secured to the valves at points within the intake manifold so as to be rotated with the valves and in a manner to further vaporize and inject gaseous fuel into the cylinders through the intake ports.

5. In an internal combustion engine as embodied in claim 3 wherein ducts are provided in the cylinder block adjacent the bottom of the pockets for conducting excess oil from the pockets to a common discharge.

6. In an internal combustion engine as embodied in claim 3 wherein a plate provided with openings is interposed between the cylinder block and intake manifold in spanning relation to the pockets, and springs mounted on the tubular shafts between and engaging the valves and plate for urging the valves into a firm seat within the pockets.

7. In an internal combustion engine, ports in the walls of the cylinders, rotary disk valves controlling the ports, means for actuating the valves to open and close the ports in a predetermined sequence, an intake manifold covering the valves, and means in the manifold, operable by the valves for further vaporizing and positively injecting a gaseous fuel into the cylinders through said ports.

CHESTER GORDEN ROSS.